United States Patent
Ilin et al.

(10) Patent No.: US 12,282,319 B2
(45) Date of Patent: Apr. 22, 2025

(54) METHOD AND DEVICE FOR SETTING OPERATING PARAMETERS OF A LASER MATERIAL PROCESSING MACHINE

(71) Applicant: Robert Bosch GmbH, Stuttgart (DE)

(72) Inventors: Alexander Ilin, Ludwigsburg (DE); Anna Eivazi, Renningen (DE); Heiko Ridderbusch, Schwieberdingen (DE); Julia Vinogradska, Stuttgart (DE); Petru Tighineanu, Ludswigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 740 days.

(21) Appl. No.: 17/452,163

(22) Filed: Oct. 25, 2021

(65) Prior Publication Data

US 2022/0137608 A1 May 5, 2022

(30) Foreign Application Priority Data

Nov. 3, 2020 (DE) ...................... 10 2020 213 813.3

(51) Int. Cl.
*G05B 19/418* (2006.01)
*G06F 18/214* (2023.01)
*G06F 18/2415* (2023.01)

(52) U.S. Cl.
CPC ... *G05B 19/41885* (2013.01); *G05B 19/4183* (2013.01); *G05B 19/4188* (2013.01); *G06F 18/214* (2023.01); *G06F 18/24155* (2023.01)

(58) Field of Classification Search
None
See application file for complete search history.

(56) References Cited

U.S. PATENT DOCUMENTS

| 2014/0148939 A1* | 5/2014 | Nakano | B23Q 17/2414 |
| | | | 700/166 |
| 2015/0076125 A1* | 3/2015 | Toyosawa | B23K 26/08 |
| | | | 219/121.79 |

(Continued)

FOREIGN PATENT DOCUMENTS

DE 102018217966 A1 4/2020

OTHER PUBLICATIONS

Hertlein et al. 'Prediction of selective laser melting part quality using hybrid Bayesian network' Additive Manufacturing 32 (2020) 101089, published Jan. 24, 2020.*

(Continued)

*Primary Examiner* — Bernard G Lindsay
(74) *Attorney, Agent, or Firm* — NORTON ROSE FULBRIGHT US LLP; Gerard A. Messina

(57) ABSTRACT

A method for setting operating parameters of a system, in particular, a manufacturing machine, with the aid of Bayesian optimization of a data-based model, which (in the Bayesian optimization) is trained to output a model output variable, which characterizes an operating mode of the system, as a function of the operating parameters. The training of the data-based model takes place as a function of at least one experimentally ascertained measured variable of the system and the training also taking place as a function of at least one simulatively ascertained simulation variable. The measured variable and the simulation variable each characterize the operating mode of the system. The measured variable and/or the simulation variable is transformed during training with the aid of an affine transformation.

14 Claims, 6 Drawing Sheets

(56) References Cited

U.S. PATENT DOCUMENTS

| | | | |
|---|---|---|---|
| 2017/0032281 A1 | 2/2017 | Hsu | |
| 2020/0254563 A1* | 8/2020 | Grapov | B23K 26/38 |
| 2020/0282493 A1* | 9/2020 | Hippert | B05B 12/004 |
| 2020/0298499 A1* | 9/2020 | Gupta | B22F 10/85 |
| 2020/0316713 A1* | 10/2020 | Yang | B23K 26/22 |
| 2022/0281177 A1* | 9/2022 | Gu | G06N 3/045 |

OTHER PUBLICATIONS

Wahab et al. 'Machine-learning-assisted fabrication: Bayesian optimization of laser-induced graphene patterning using in-situ Raman analysis' Carbon 167 (2020) 609-619, published Jun. 12, 2020.*

Maier, et al.: "Bayesian optimization for autonomous process set-up in turning", CIRP Journal of Manufacturing Science and Technology, 26 (2019), pp. 81-87, ISSN 1755-5817.

* cited by examiner

METHOD AND DEVICE FOR SETTING OPERATING PARAMETERS OF A LASER MATERIAL PROCESSING MACHINE

FIELD

The present invention relates to a method for setting operating parameters of a physical system, to a test stand, to a computer program and to a machine-readable memory medium.

BACKGROUND INFORMATION

Drilling with laser radiation is a manufacturing method for making holes in highly differing materials. In the process, a work piece is acted upon, for example, by the pulsed and focused laser beam. As a result of the very high intensity, the absorbed laser energy results in a pulse-like very rapid heating of the workpiece material, which results in melt formation and in part also vaporization on short time scales and spatially very localized.

As a result of the process-related explosively generated vapor pressure and associated therewith also high pressure gradients or also as a result of externally fed gas flows, the melted material is expulsed from the hole. At particularly high intensities, which are implemented, for example, by the use of laser radiation with ultra-short laser pulses, the proportion of vaporization is greater and more precise holes may be achieved.

In the case of longer pulse durations and lower intensities, the drill hole formation is clearly dominated by melt expulsion, which results in a reduced precision with significantly higher productivity. In many cases, numerous laser pulses per hole are necessary in order to make the desired drill hole. To improve the precision of the drill hole, the laser beam may usually be guided at the drilling position on a circular or spiral path with the aid of suitable devices.

In the laser drilling manufacturing method, the process development is typically experimental in character, because the numerous high-dynamic and interacting physical effects are presently unable to be modeled with sufficient accuracy. This includes the fact that the workpiece characteristic data for the relevant pressures and temperatures are often unknown. Highly simplified models at best are available, with which a certain prediction of the achieved drill hole shape is possible with given process parameters and in particular parameter ranges. Reliable predictions regarding quality characteristics such as, for example, solidified melt deposits within the hole or also in the form of a burr at the drill hole entrance, damages to the drill hole edge or also the circularity of the drill holes are presently not possible with these models.

Laser welding is an established manufacturing method for setting up connections of workpieces made of different materials. In this method, the workpieces to be connected are acted upon with a focused laser beam. As a result of the very high intensity, the absorbed laser energy results in a very rapid local heating of the workpiece materials, which results in a shared melt bath formation on short time scales and spatially very localized. After the solidification of the melt bath, a connection forms between workpieces in the form of a weld seam.

In order to meet the requirements of connection strength (as well as fatigue strength), it may be desirable for the geometry of the weld seam not to fall below a minimally allowable weld seam depth and a minimally allowable weld seam width. In order to obtain the desired weld seam shapes, the process parameters may be selected in such a way, that a rapid and local heating of the materials by the laser radiation results in a vaporization in the melt bath. As a result of the process-related explosively generated vapor pressure and the associated high pressure gradients or also as a result of externally fed gas flows, the melted material is expulsed from the melt bath. The resulting metallic spatters (so-called weld spatters) may result in a decrease in the component quality and/or necessitate production interruptions for cleaning the laser welding equipment, which causes a significant increase of the manufacturing costs.

As in the case of laser drilling, the process development (process optimization with the aim of minimizing the weld spatters) is highly experimental in character in laser welding as well, because the numerous high-dynamic and interacting physical effects are not able to be modelled with sufficient accuracy.

One challenge in the case of modeling is that the workpiece characteristic data for the relevant pressures and temperatures are often unknown. The manufacturing tolerances of the individual workpieces as well as the fluctuations in the materials may strongly influence the formation of the weld spatters. Highly simplified models are in fact available, with which a certain prediction of the achieved weld seam shape is possible with given process parameters and in particular parameter ranges. However, a reliable prediction regarding quality characteristics such as, for example, solidified weld spatters is not possible with these models.

Thus, several process parameters, for example, are set to empirically based values and only relatively few parameters are even varied. In this case, the actually achievable optimum is generally not found.

SUMMARY

It has been found that during laser material processing, the achievable precision and productivity are very largely a function of the set process parameters, of the workpiece material used and, in part, also of the geometry thereof.

The quality criteria of a drilling process are numerous. For example, a size of the drill hole (for example, a depth-dependent diameter profile), a circularity of the holes, a shape of the drill hole wall, any melt deposits, droplet ejection during the drilling process and a rounding of the drill hole edges are important. The productivity is typically defined by the number of producible holes per unit of time. Moreover, in practice, the costs of the necessary production equipment are, of course, also decisive, with increasing flexibility of the variable parameters comes normally also an increase in costs.

Because there are many settable process parameters (for example, pulse duration, focus position (time-dependent), focal length, pulse repetition frequency, circular path diameter (time-dependent), circular path frequency, setting angle (time-dependent), drilling duration, pulse energy (time-dependent), wavelength, process gas type and process gas pressure, which frequently may also be time-dependently varied, the optimization of the process parameters is a lengthy process, which requires a large number of experiments. Because, on the one hand, many workpieces or components are required for these experiments and, on the other hand, the evaluation (in particular of the interior drill hole shape) is also time-consuming, it is necessary to reduce the number of required tests to a minimum.

For this reason, several parameters may be set to empirically based values and only relatively few parameters may even be varied. For this reason, the actual achievable optimum may generally not easily be found. Test series predefined by experts and/or also methods of statistical test planning are possible as planning methods for the tests.

In the case of laser welding as well, because there are many settable process parameters (which are often time-dependent or position-dependent), such as laser power, focus diameter, focus position, welding speed, laser beam inclination, circular path frequency, process inert gas, the optimization of the process parameters is a lengthy process, which requires a large number of experiments. Because, on the one hand, many workpieces or components are required for these experiments and, on the other hand, the evaluation (preparation of cross sections for the measurement of the weld seam geometry) is also time-consuming, it is desirable that the number of required tests is reduced to a minimum.

An example embodiment of the present invention may have the advantage over the related art that with only few experiments, it is possible to find process parameters of laser material processing machines, which ensure a high quality of the laser material processing.

Further aspects of the present invention are disclosed herein. Advantageous refinements of the present invention are disclosed herein.

The present invention relates to the manner in which an efficient and targeted optimization of the process parameters may be carried out. In accordance with an example embodiment of the present invention, the Bayesian optimization method is utilized for this purpose. With the aid of this method, it is possible to find optima in unknown functions. An optimum is characterized by target values $q_{i,target}$ for one or multiple quality characteristics (features) $q_i$, which are specified by a user. Multiple quality characteristics may be allocated in a so-called cost function K in order to obtain a single function to be optimized. This cost function as well must be predefined by the user. One example is the sum of scaled deviations from the respective target value:

$$K = \sum_{i=1}^{N} s_i |q_i - q_{i,target}| \tag{1}$$

Parameters $s_i$ in this case are predefinable scaling parameters. In order to find the optimum of the cost function, parameter sets for the next experiment may be provided by using the Bayesian optimization. After the experiment is carried out, the resulting values of the quality criteria and thus, the instantaneous cost function value, may be determined and provided together with the set process parameters as a data point to the optimization method.

For a function which maps a multi-dimensional input parameter space on scalar output values, the Bayesian optimization method is suitable for finding that input parameter set, which results in the optimal output value. Depending on the optimization target, the optimum in this case is defined as the largest possible value or alternatively also the minimally achievable value, which the function values are able to adopt. In terms of the process optimization, the input parameter set is given, for example, by a particular set of process parameters; the associated output value may be ascertained by the above-described cost function.

Because experiments are required to be carried out and evaluated for determining the functional values of the cost function, in principle only one value table of the function is available, including data which also include an experimental "noise." Because the experiments are very complex, this noise may normally not be suppressed by numerous repetitions in the same input parameter set with subsequent averaging of the results. For this reason, it is advantageous to carry out the optimization with a method, which enables a global optimization with good results, even in spite of fewer test evaluations, and manages in the process without a calculation of gradients of the cost function. It has been found that the Bayesian optimization meets these specifications.

The Bayesian optimization involves the mathematical method of the Gaussian processes, with which a prediction of the most probable functional value including its variance results based on a given value table for each input parameter set, and on an algorithmically formulated specification for which input parameter set a further functional evaluation (i.e., in our case an experiment) is to be carried out, which is based on the predictions of the Gaussian process.

Specifically, the prediction for the result of the functional evaluation in an input parameter set $x_{N+1}$ provided by the most probable value ("mean value") of the Gaussian process is $$m(x_{N+1}) = k^T C_N^{-1} t \tag{2}$$

with the variance $$\sigma^2(x_{N+1}) = C - k^T C_N^{-1} k \tag{3}$$

Here, $C_N$ means the covariance matrix, which is provided by $$[C_N]_{nm} = k(x_n, x_m) + \beta^{-1} \delta_{nm}, \text{ with } n, m = 1 \ldots N, \tag{4}$$

$x_n$ and $x_m$ being parameters, in which a functional evaluation has already taken place. Variable $\beta^{-1}$ represents the variance of the normal distribution, which stands for the reproducibility of experiments with the same input parameter, $\delta_{nm}$ is the Kronecker symbol. Scalar c is conventionally provided by $c = k(x_{N+1}, x_{N+1}) + \beta^{-1}$. Vector t contains the respective results to the individual parameter sets $x_i$ (i=1 ... N), in which a functional evaluation has taken place. The so-called kernel function $k(x_n, x_m)$ describes to what extent the result of the functional evaluation in a parameter set $x_n$ still has an influence on the result of the functional evaluation in a parameter set $x_m$. High values in this case stand for a high influence; if the value is zero, there is no longer any influence.

For the prediction of the mean value and the variance in the above formula, vector k is calculated with $[k]_i = k(x_i, x_{N+1})$, in addition with respect to all input parameter sets $x_i$ (i=1 ... N) and parameter set $x_{N+1}$ to be predicted. For the kernel function to be used in a specific case, there are different approaches, one very simple approach is represented by the following exponential kernel:

$$k(x_n, x_m) = \Theta_0 \exp(-\Theta_1 \|x_n - x_m\|), \tag{5}$$

with selectable hyperparameters $\Theta_0$ and $\Theta_1$. In this kernel, $\Theta_1$ is decisive for the influence of the "distance" between the functional values in input parameters $x_n$ and $x_m$, because the function for large values goes from $\Theta_1$ to zero. Other kernel functions are possible.

The selection of the next parameter set on which a test is to be carried out is based on the predictions of mean values and variance calculated with the above formulas. Different strategies are possible here; for example, that of "expected improvement."

In this strategy, the input parameter set for the next experiment is selected, in which the expected value for finding a functional value, which is greater (or smaller, depending on the optimization target) than the greatest (or smallest, depending on the optimization target) known functional value A from the previous N iteration, i.e., $$x_{N+1} = \arg\max E_N[[f(x) - f_N^*]^+]. \tag{7}$$

Such a function to be optimized is also referred to as an acquisition function. Other acquisition functions are possible, for example, a knowledge gradient or an entropy search.

The "+" operator here means that only positive values are used and negative values are set to zero. In the Bayesian optimization, now iteratively
- a new test point (i.e., input parameter set) is determined,
- a new test is carried out,
- the Gaussian process is updated with the new functional value until the optimization is aborted.

The optimization of the Gaussian process with the new test point and the new functional value occurs in such a way that the new pair made up of test point and functional value is added to the previously recorded test data made up of pairs of test points and functional values, and the hyperparameters are adapted in such a way that a probability (for example, a likelihood) of the test data is maximized.

This process is illustrated in conjunction with FIG. 4.

Using the iterative approach of the previously described steps (carrying out an experiment, evaluating the quality criteria and determining the cost function value, update of the Gaussian process and providing the next parameter set), it is possible to successively construct a process model (mapped by the Gaussian process). The best parameter set of all evaluated functional evaluations or tests is then used as the best optimization result.

Advantages in carrying out the optimization are gained by integrating present process knowledge. Using the approach described below, it is possible to integrate knowledge in the form of one or multiple process models $P_{1 \ldots n}$ into the optimization by replacing real experiments under particular conditions with simulation experiments. In this case, it is irrelevant to what degree of uncertainty the models map the process and how many of the quality criteria they describe.

With a process model that would perfectly map the real experiment, each real experiment could be replaced by a simulation experiment. If in this case the evaluation period were less than the real implementation, time, in addition to effort, would also be saved. In general, however, the prediction accuracy of the process models is limited. They are often valid only in a subarea of the parameter space and/or describe only a subset of the process results, and do not take all physical effects into account, and therefore generate results only with an uncertainty band. As a rule, therefore, process models are only able to partially but not completely replace physical experiments.

Within the context of the present invention disclosed herein, the process simulation models, which are able to predict a subset of the relevant features with a known accuracy, are initially called up with each iterative optimization step. No genuine real experiment is carried out if, due to the predicted process result even within the scope of the prediction accuracy, it may be ruled out with sufficient certainty that the process result will be close to the target values. Instead, the results calculated with the process model are used here alternatively as an experimental result and the optimization process is continued.

If multiple process simulation models having different prediction accuracy for different areas in the parameter space are available, the process simulation model having the best prediction accuracy may be used in each case.

In one first aspect, an example embodiment of the present invention relates to a method for setting operating parameters x of a (physical) system, in particular, of a manufacturing machine such as a laser material processing machine (the operating parameters may then be provided by process parameters) with the aid of Bayesian optimization of a data-based model, which is trained (in particular, in the Bayesian optimization), to output a model output variable $y,\mu$, which characterizes an operating mode of the system, as a function of the operating parameters x, the training of the data-based model taking place as a function of at least one experimentally ascertained measured variable $y_{exp}$ of the system, and the training also taking place as a function of at least one simulatively ascertained simulation variable $y_{sim}$, both measured variable $y_{exp}$ as well as simulation variable $y_{sim}$ each characterizing the operating mode of system 1, 2, (measured variable $y_{exp}$ and the variable simulated by simulation variable $y_{sim}$ being different physical variables), measured variable $y_{exp}$ and/or simulation variable $y_{sim}$ being transformed during training with the aid of an affine transformation.

The affine transformation makes it possible, in particular, for training, to combine experiments and simulations, even when the measured variable and a physical variable simulated by the simulation variable are different physical variables and, in particular, even when these variables include different physical units. It is namely advantageous to combine simulations and experiments for training, since simulations may be easily and rapidly carried out, but are often rather disadvantageous in terms of their accuracy, whereas experiments often exhibit a high degree of accuracy, but are very time-consuming to carry out.

The output variable trained by the data-based model is advantageously a variable, which is either experimentally or simulatively ascertainable. If this variable is either not also simulatively or experimentally ascertainable, it is possible via the affine transformation, to transform that variable, whose physical units do not match the physical units of the output variable of the data-based model, in such a way that the variables become combinable for training.

In order to ensure that different measured variables and simulation variables may be combined with one another in the best possible manner, it may be provided that in the affine transformation, measured variable $y_{exp}$ and/or simulation variable $y_{sim}$ is/are multiplied by a factor, and this factor is selected as a function of a simulative model uncertainty $\sigma_P$ and as a function of an experimental model uncertainty $\sigma_{exp}$.

If the factor is selected as a function of the (in particular, equal to the) quotient of the simulative model uncertainty and of the experimental model uncertainty, this results in the possibility of a particularly meaningful comparability of simulation variable and measured variable.

In one refinement of the present invention, it is provided that the data-based model includes a simulatively trained submodel $GP_0$, in particular, a Gaussian process model, and an experimentally trained second submodel $GP_P$, in particular, a Gaussian process model, simulative model uncertainty $\sigma_P$ being ascertained with the aid of first submodel $GP_0$, and experimental model uncertainty $\sigma_{exp}$ being ascertained with the aid of second submodel $GP_P$. This enables a correct estimation of the experimental model uncertainty, even when the simulatively trained first submodel is also combined in the data-based model with a further experimentally trained model in order to optimize the model accuracy.

The data-based model advantageously includes an experimentally trained third submodel $GP_1$, in particular, a Gaussian process model, which is trained to output a difference between experimentally ascertained measured variable $y_{exp}$ and an output variable $\mu_P$ of first submodel $GP_0$. In this way, measured variable and simulation variables may be particularly easily combined, in particular, when they are conflicting.

BRIEF DESCRIPTION OF THE DRAWINGS

Specific embodiments of the present invention are explained in greater detail below with reference to the figures.

DETAILED DESCRIPTION OF EXAMPLE EMBODIMENTS

Figure 1:
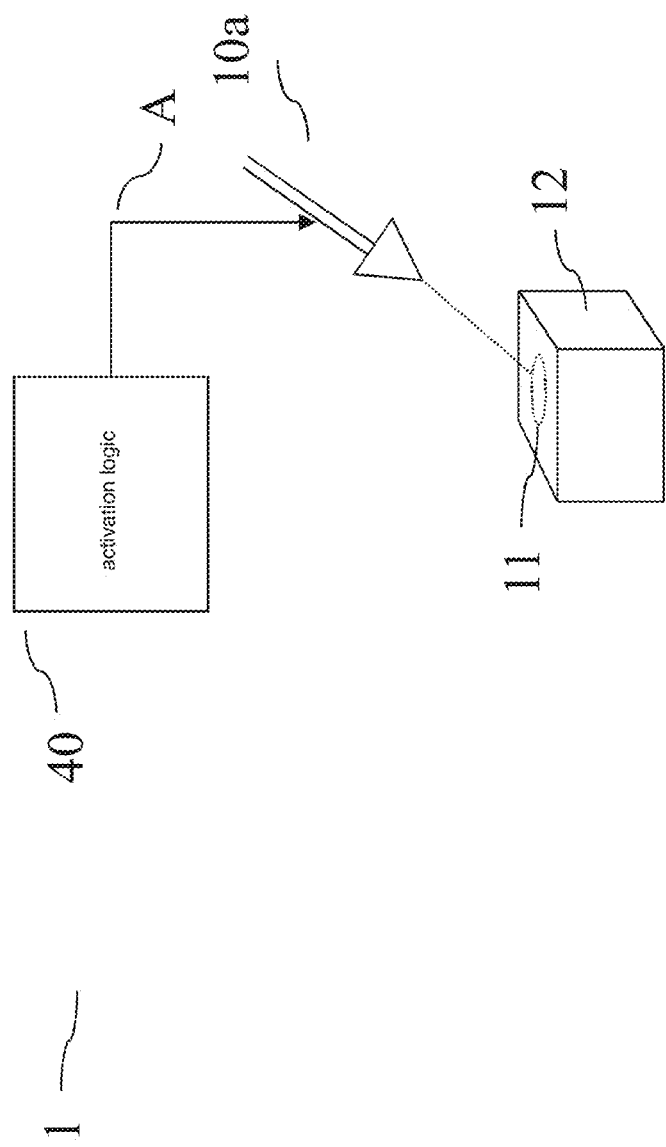
FIG. 1 schematically shows a structure of a laser drilling machine.

FIG. 1 schematically shows a structure of a laser drilling machine 1. An activation signal A is provided by an activation logic 40 in order to activate laser 10a. The laser beam strikes a material piece 12, where it generates a drill hole 11.

Figure 2:
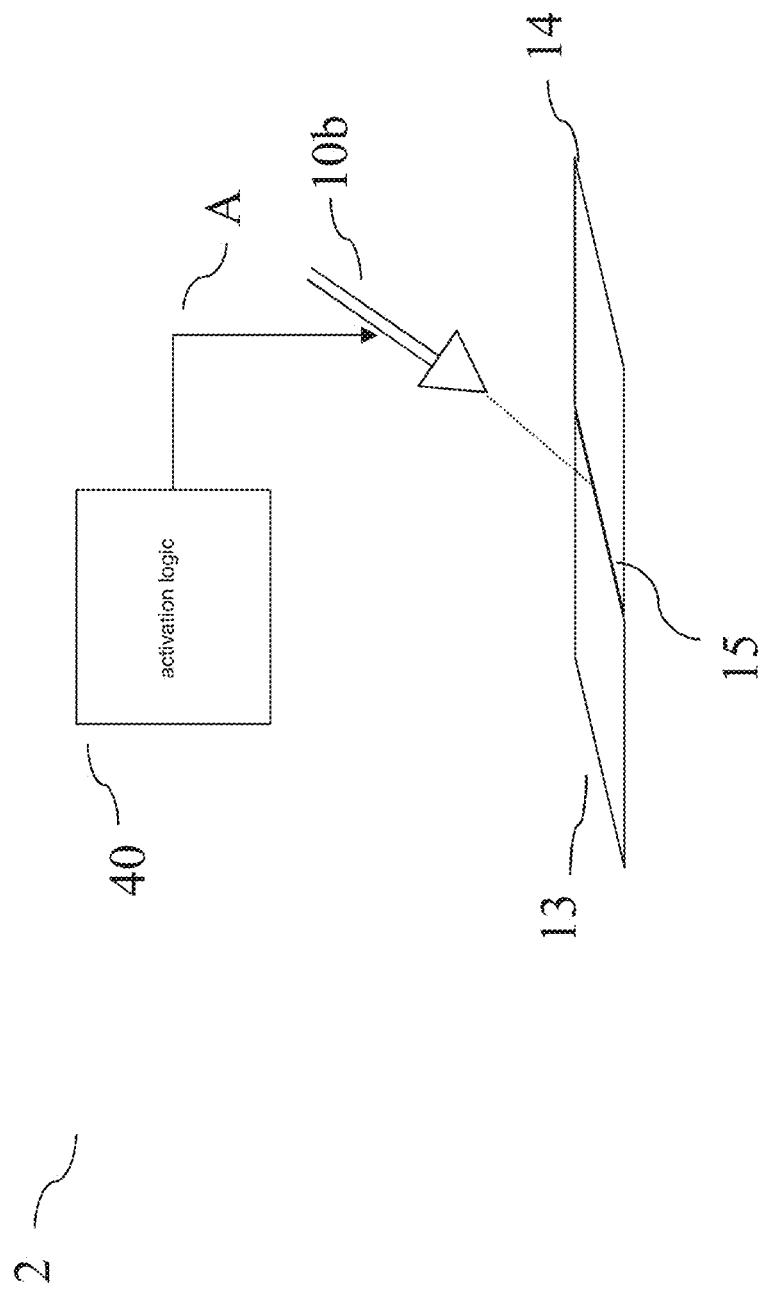
FIG. 2 schematically shows a structure of a laser welding machine.

FIG. 2 schematically shows a structure of a laser welding machine 2. An activation signal A is provided here as well by an activation logic 40 in order to activate a laser 10b. The laser beam strikes two material pieces 13, 14 where it generates a weld seam 15.

A laser cutting machine (not represented) is also similarly possible.

Figure 3:
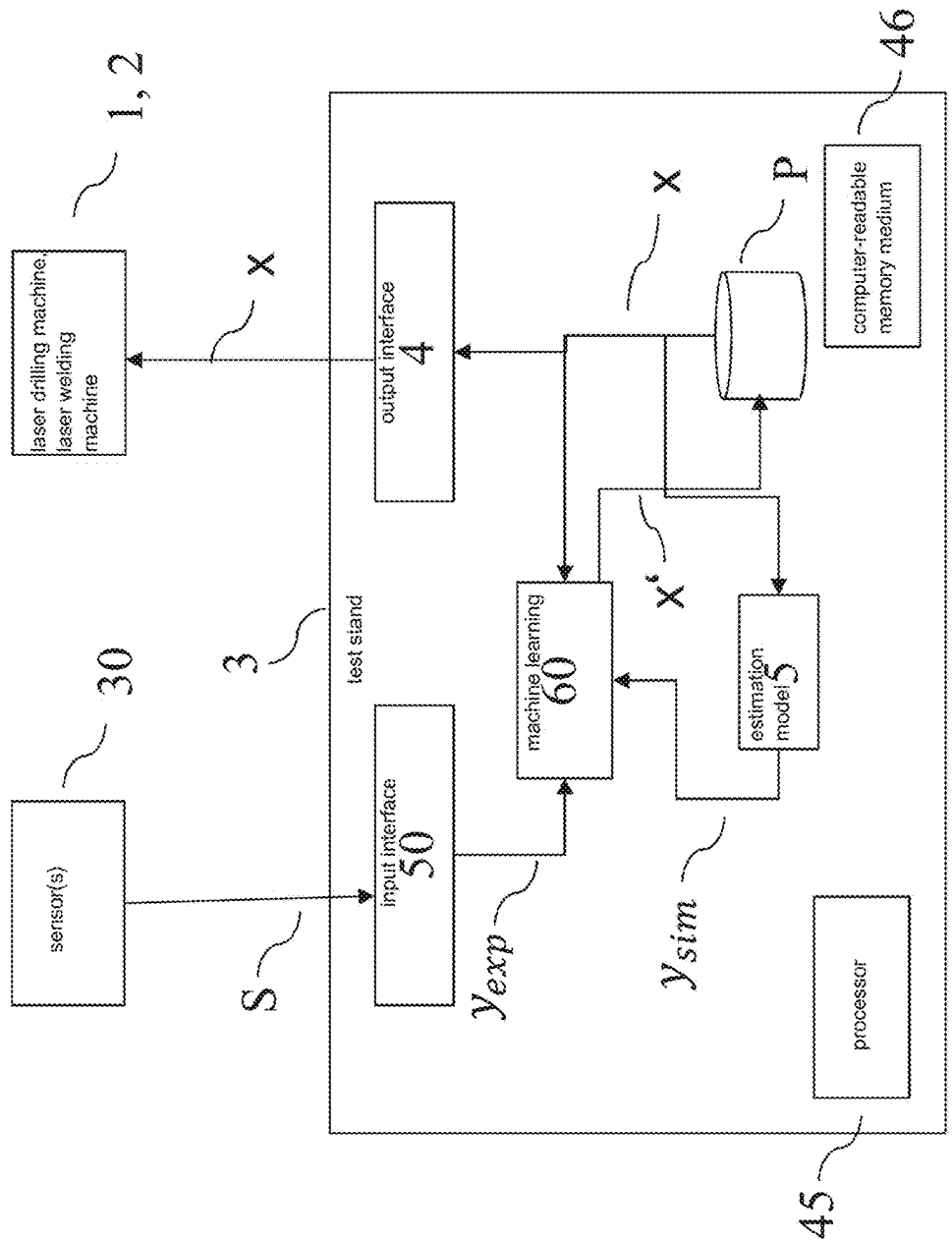
FIG. 3 schematically shows a structure of a test stand, in accordance with an example embodiment of the present invention.

FIG. 3 schematically shows a structure of a test stand 3 for ascertaining optimal process parameters x. Instantaneous process parameters x are provided by a parameter memory P via an output interface 4 of the laser material processing machine such as, for example, of laser drilling machine 1 or of laser welding machine 2. This carries out the laser material processing as a function of these provided process parameters x. Sensors 30 ascertain sensor variables S, which characterize the result of the laser material processing. These sensor variables S are provided via an input interface 50 as quality characteristics $y_{exp}$ to a machine learning block 60.

Figure 4:
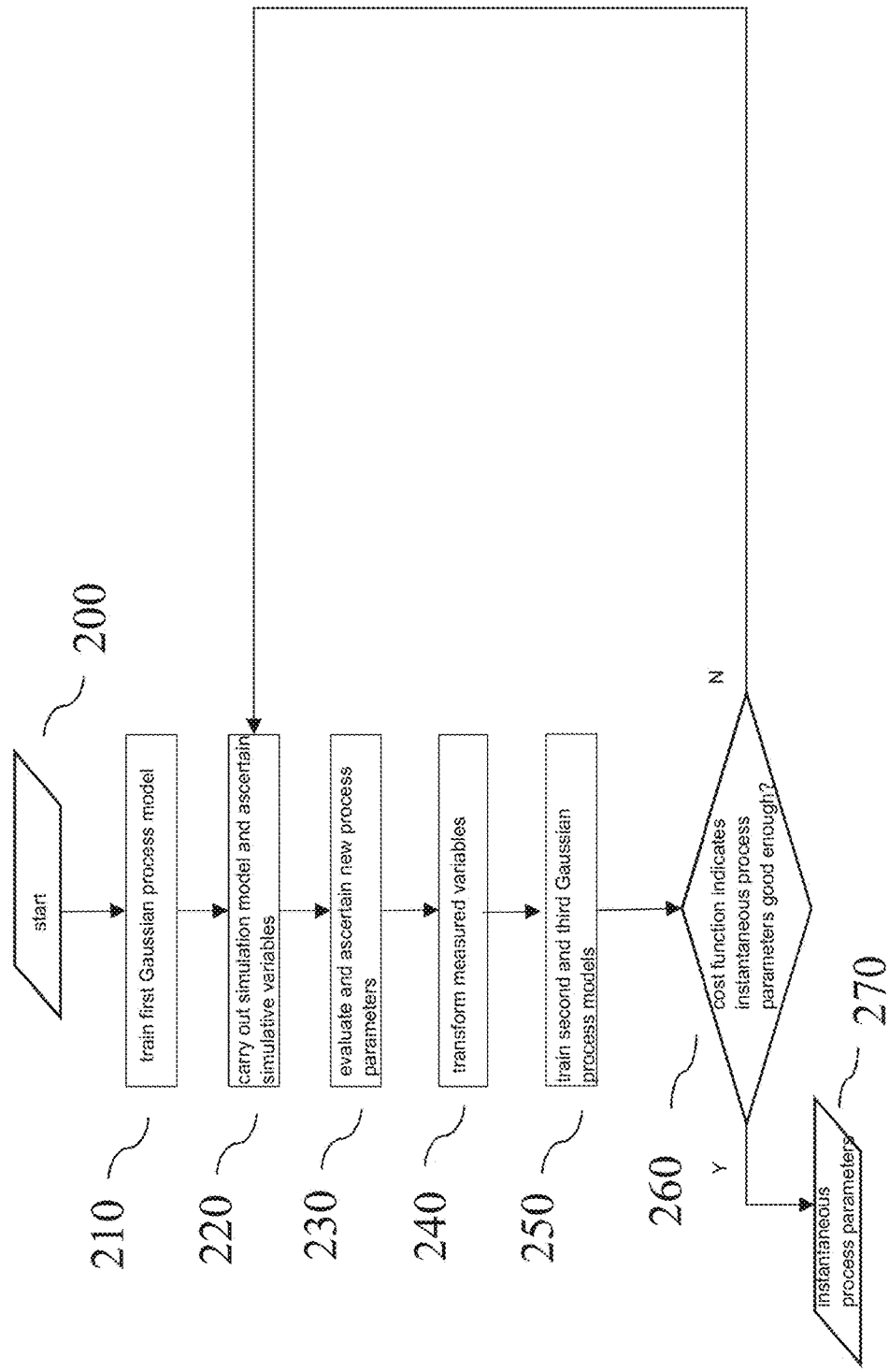
FIG. 4 shows in a flowchart one specific embodiment for operating the test stand, in accordance with the present invention.
Figure 5:
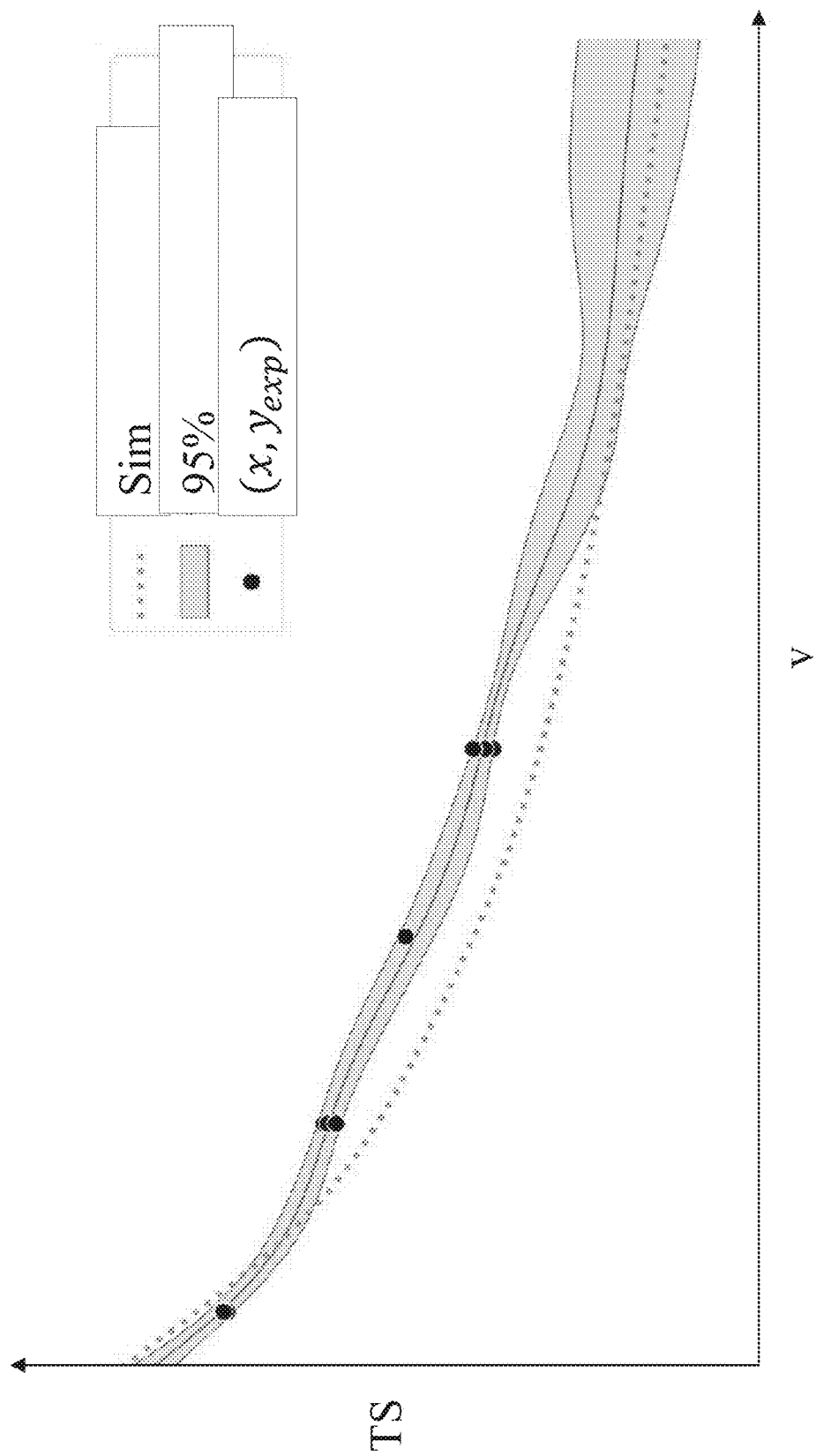
FIG. 5 shows by way of example a profile of simulated and measured and trained output variables over an operating variable, in accordance with the present invention.

Machine learning block 60 in the exemplary embodiment includes a data-based model which, as illustrated in FIG. 4 and FIG. 5, is trained as a function of provided quality characteristics $y_{exp}$. Varied process parameters x', which are stored in parameter memory P, may be provided as a function of the data-based model.

Process parameters x may be alternatively or additionally provided for also providing an estimation model 5 via output interface 4, which provides estimated quality characteristics $y_{sim}$ instead of actual quality characteristics $y_{exp}$ to machine learning block 60.

The test stand in the exemplary embodiment includes a processor 45, which is configured to play back a computer program, which is stored on a computer-readable memory medium 46. This computer program includes instructions, which prompt processor 45 to carry out the method illustrated in FIG. 4 and FIG. 5 when the computer program is played back. This computer program may be implemented in software, or in hardware, or in a mixed form of hardware and software.

FIG. 4 shows in a flowchart a method for setting process parameters x of test stand 3. The method starts 200 by providing a respectively initialized first Gaussian process model $GP_0$, second Gaussian process model $GP_r$ and third Gaussian process model $GP_1$. The sets of the previously recorded test data belonging to the respective Gaussian process models are each initialized as an empty set.

First Gaussian process model $GP_0$ is then 210 simulatively trained. For this purpose, initial process parameters $x_{init}$ are provided as process parameters x and process parameters x are optionally predefined with a design-of-experiment method and, as explained in greater detail below, ascertained with simulation data $y_{sim}$ associated with these process parameters x, and first Gaussian process model $GP_0$ is trained with the test data thus ascertained.

A simulation model of laser material processing machine 1, 2 is then carried out using instantaneous process parameters x and simulative variables $y_{sim}$ are ascertained 220, which characterize the result of the laser material processing.

In the case of laser drilling, this may take place, for example, as follows: for a radius r of drill hole 11 along a deep coordinate z, r(z) is numerically ascertained as the solution of the equation $$[1-R(r,z,\alpha,\theta)] \cdot \cos\theta \cdot F_0(r,z) - \tilde{F}_{th} = 0 \qquad (8)$$

where $$1 - R = \frac{1}{2} \cdot \left( \frac{4n\cos\theta}{(n^2+k^2)+2n\cos\theta+\cos^2\theta} + \frac{4n\cos\theta}{(n^2+k^2)\cos^2\theta+2n\cos\theta+1} \right) \qquad (9)$$

$$F_0(r, z) = \frac{2Q}{\pi w^2(z)} \cdot \exp\left(-\frac{2r^2}{w^2(z)}\right) \qquad (10)$$

$$w(z) = \frac{d_{Fok}}{2}\sqrt{1 + \left(\frac{z}{l_{Rayleigh}}\right)^2} \qquad (11)$$

$$\tan\alpha = \frac{r}{w(z)}\frac{dw(z)}{dz} \qquad (12)$$

In this case:
$\bar{n} = n + ik$ is a predefinable complex refractive index of material piece 12, with refractive index n and extinction coefficient k,
$\tilde{F}_{th}$ is a predefinable ablation threshold fluence of material piece 12,
Q is a predefinable pulse energy of laser 10a,
$d_{Fok}$ is a predefinable focus diameter of laser 10a,
$l_{Rayleigh}$ is a predefinable Rayleigh length of laser 10a,
R is an ascertained reflectivity of material piece 12,
α is an ascertained angle of the local beam propagation direction,
θ is a predefinable relative angle between incident laser beam and surface normal of material piece 12,
$F_0$ is an ascertained radiated fluence of laser 10a,
w(z) is an ascertained local beam radius.

In the case of laser welding, the ascertainment of estimated variables $y_{sim}$ may take place, for example, as follows:

$$T(x, y, z) - T_0 = \frac{1}{2\pi\lambda h} \exp\left(-\frac{v(x-x_0)}{2a}\right) \quad (13)$$

$$\left(q_{net}K_0\left(\frac{vr}{2a}\right) + 2\sum_{m=1} \cos\left(\frac{m\pi z}{h}\right)K_0\left(\frac{vr}{2a}\sqrt{1+\left(\frac{2m\pi a}{vh}\right)^2}\right)I_m\right)$$

with $$r = \sqrt{(x-x_0)^2 + y^2} \quad (14)$$

$$I_m = \int_0^h q_{1net}(z)\cos\left(\frac{m\pi z}{h}\right)dz \quad (15)$$

and the parameters $T_0$—a predefinable ambient temperature;

$x_0$—a predefinable offset of the beam of laser 10b relative to the origin of a coordinate system movable with laser 10b;

$\lambda$—a predefinable heat conductivity of material pieces 13, 14;

$a$—a predefinable temperature conductivity of material pieces 13, 14;

$q_{net}$—a predefinable power of laser 10b;

$q_{1net}$—a predefinable power distribution of laser 10b along a depth coordinate of material pieces 13, 14;

$v$—a predefinable speed of laser 10b;

$h$—a predefinable thickness of material pieces 13, 14;

and with Bessel function $$K_0(\omega) = \frac{1}{2}\int_{-\infty}^{\infty} \frac{e^{i\omega t}}{\sqrt{t^2+1}} dt$$

as well with an ascertained temperature distribution $T(x,y,z)$. From the temperature distribution, it is possible to ascertain a width and a depth of the weld seam (for example, via the ascertainment of isotherms at a melting temperature of one material of material pieces 13, 14). From the temperature distribution, it is possible, for example, to also directly ascertain an entire power input.

A cost function K is evaluated as a function of these variables, as it may be provided, for example by equation 1, variables $y_{sim}$ being provided as features $q_i$ and corresponding target values of these variables $q_{i,target}$.

A cost function K is also possible, which punishes deviations of the features from the target values, in particular if they exceed a predefinable tolerance distance, and rewards a high productivity. The "punishment" may be implemented, for example by a high value of cost function K, the "reward" correspondingly by a low value.

It is then ascertained whether cost function K indicates that instantaneous process parameters x are good enough; in the event that a punishment means by a high value and a reward means by a low value it is checked whether cost function K drops below a predefinable maximum cost value. If this is the case, the simulative training ends with instantaneous process parameters x.

If this is not the case, data point $x, y_{sim}$ thus obtained from process parameters x and associated variables $y_{sim}$ characterizing the result is added to the ascertained test data and first Gaussian process model $GP_0$ is retrained, i.e., hyperparameters $\Theta_0, \Theta_1$ of first Gaussian process model $GP_0$ are adapted in such a way that a probability that the test data result from the first Gaussian process model $GP_0$ is maximized.

An acquisition function is then evaluated, as is illustrated, for example, in formula 7, and a new process parameter x' hereby ascertained. The step of evaluating the simulation model is then returned to, new process parameters x' being used as instantaneous process parameters x and the method runs through a further iteration.

After simulative training of first Gaussian process model $GP_0$ has occurred, process parameters x are subsequently evaluated using an acquisition function, as is illustrated, for example, in formula 7 and new process parameters referred to below as $x_{exp}$, are ascertained 230 in order to experimentally train second Gaussian process model $GP_V$ and third Gaussian process model $GP_2$. With these process parameters $x_{exp}$, laser material processing machine 1, 2 is activated and measured variables $y_{exp}$ are ascertained, which characterize the actual result of the laser material processing, and the data-based model is trained with the test data thus ascertained as described below.

In the case of laser drilling, these process parameters x include, for example, a pulse duration and/or a focus position time-dependently resolved via a characteristic diagram and/or a focal length and/or a pulse repetition frequency and/or a circular path diameter time-dependently resolved via a characteristic diagram (time-dependent) and/or a circular path frequency and/or a setting angle time-dependently resolved via a characteristic diagram and/or a drilling duration and/or a pulse energy time-dependently resolved via a characteristic diagram and/or a wavelength and/or parameters, which characterize a process inert gas such as, for example, a process gas type or a process gas pressure. The aforementioned circular path in this case is a known feature in many drilling methods, for example, in spiral drilling or in trepanning. Measured variables $y_{exp}$ include, variables, for example, which characterize the size of drill hole 11 and/or the circularity of drill hole 11 and/or the shape of a wall of drill hole 11 and/or the presence of melt deposits and/or a quantity of droplet ejection during the drilling process and/or a rounding of the edges of drill hole 11 and/or the productivity.

In the case of laser welding, process parameters x include, for example, laser power time-dependently or position-dependently resolved via characteristic diagrams and/or a focus diameter and/or a focus position and/or a welding speed and/or a laser beam inclination and/or a circular path frequency of a laser wobbling and/or parameters that characterize a process inert gas. Measured variables $y_{exp}$ include, for example, variables which characterize a minimal weld seam depth and/or a minimal weld seam width along weld seam 15 and/or the productivity and/or a number of weld spatters and/or a number of pores and/or a welding distortion and/or internal welding stresses and or welding cracks.

To train the data-based model using the ascertained pair of process parameters $x_{exp}$ and measured variables $y_{exp}$, the following variables are initially ascertained 230:

a simulative model uncertainty $\sigma_P$ as the square root of variance $\sigma^2$ of first Gaussian process model $GP_0$ at position $x_{exp}$;

a simulative model prediction $\mu_P$ as the most probable value of first Gaussian process model $GP_0$ at position $x_{exp}$;

an experimental model uncertainty $\sigma_{exp}$ as the square root of variance $\sigma^2$ of second Gaussian process model $GP_V$ at position $x_{exp}$;

an experimental model prediction $\mu_{exp}$ as the most probable value $\mu_{exp}$ of third Gaussian process model $GP_1$ at position $x_{exp}$.

Measured variables $y_{exp}$, are now each affinely transformed 240 according to the following formula:

$$y_{exp} \to y_{exp}^{aff} = \frac{\sigma_P}{\sigma_{exp}} \cdot (y_{exp} - \mu_{exp}) + \mu_P \qquad (16)$$

Second Gaussian process model $GP_V$ and third Gaussian process model $GP_1$ are subsequently trained 250.

Second Gaussian process model $GP_V$ in this case is trained with the aid of non-transformed measured variables $y_{exp}$, in that data point $x, y_{exp}$ from process parameters x and associated measured variables $y_{exp}$ are added to the ascertained test data for second Gaussian process model $GP_V$ and second Gaussian process model $GP_V$ is retrained, i.e., associated hyperparameters $\Theta_0, \Theta_1$ of second Gaussian process model $GP_V$ are adapted in such a way that a probability that the test data result from second Gaussian process model $GP_V$ is maximized.

Third Gaussian process model $GP_1$ in this case is trained with the aid of affinely transformed measured variables $y_{exp}^{aff}$, in that data point $x, y_{exp}^{aff}$ from process parameters x and associated affinely transformed measured variables $y_{exp}^{aff}$ are added to the ascertained test data for third Gaussian process model $GP_1$ and third Gaussian process model $GP_1$ is retrained, i.e., associated hyperparameters $\Theta_0, \Theta_1$ of third Gaussian process model $GP_1$ are adapted in such a way that a probability that the test data result from third Gaussian process model $GP_1$ is maximized.

A further cost function K' is evaluated 160, similar to the evaluation of cost function K in step 210, as it may be provided for example, by equation 1, measured variables $y_{exp}$ being provided as features $q_i$ and as corresponding target values of these variables $q_{i,target}$.

It is then ascertained whether cost function K indicates that instantaneous process parameters x are good enough. (260) If this is the case ("yes"), the method ends 270 with instantaneous process parameters x.

If this is not the case, ("no"), a return is made to step 220.

Figure 6:
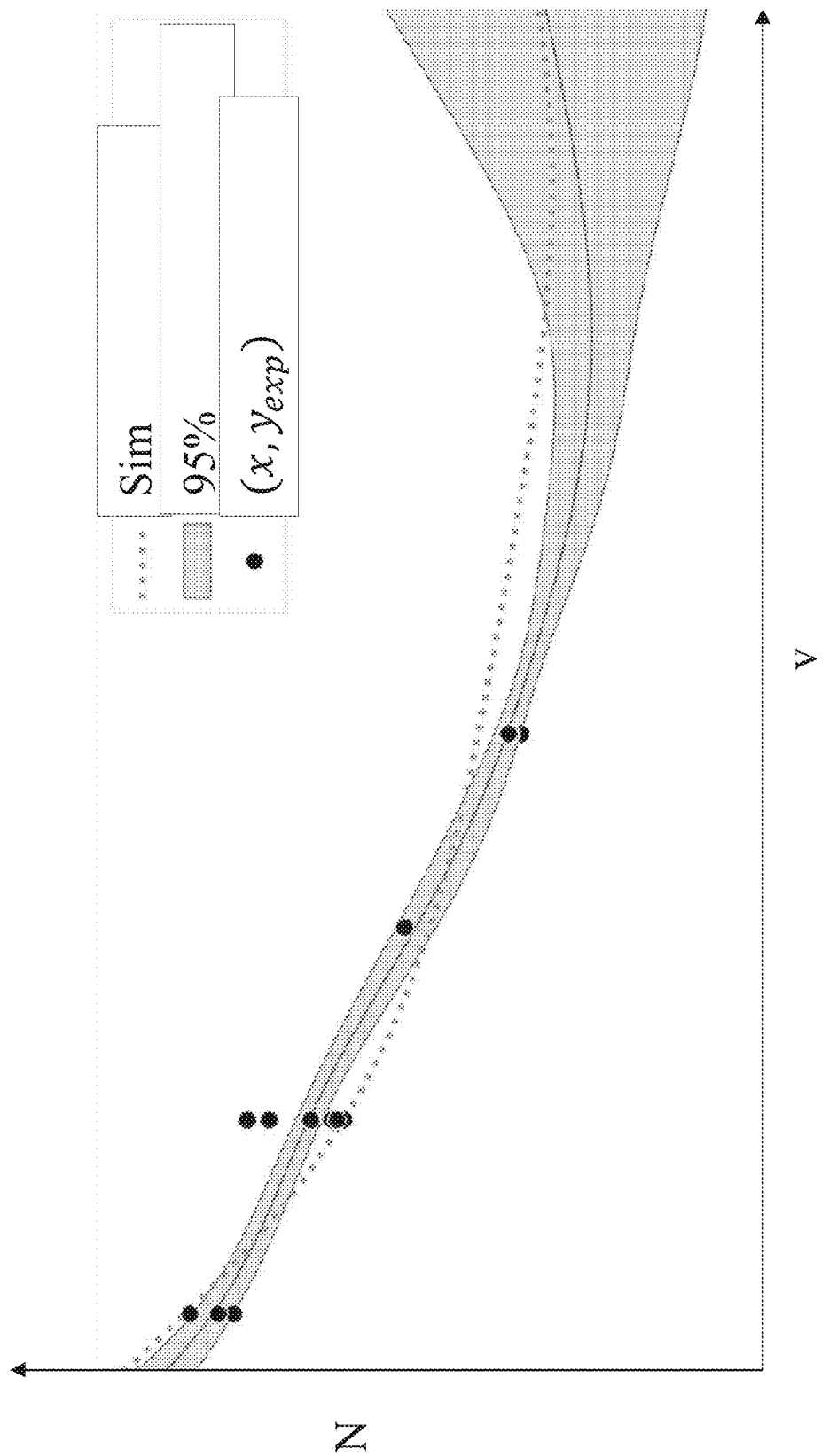
FIG. 6 shows by way of example a profile of further simulated and measured and trained output variables over an operating variable, in accordance with the present invention.

FIGS. 5 and 6 show, by way of example, for a laser welding machine, a successfully trained data-based model including the first, second and third Gaussian process model.

FIG. 5 shows a depth ST of a weld seam as a function of speed v of laser 10b;

FIG. 6 shows a number N of spatters that form during the welding process as a function of speed v.

The output of the simulation model (dotted) used for the simulative training of first Gaussian process model $GP_0$, experimentally ascertained measured points $x, y_{exp}$ (black circles), model prediction $\mu$ as the most probable value of the data-based model (center black line) and a prediction inaccuracy (95% confidence interval) of the data-based model (gray hatched area) are each represented. FIG. 6 shows the successful training of the data-based model, even though the experimentally ascertained measured variable of spatter number N is not able to be simulatively ascertained. It was discovered, however, that the number of the spatters strongly correlates with the simulatively ascertainable power input, so that this simulatively ascertainable variable is used as simulation data.

To ascertain model prediction $\mu$ as the most probable value of the data-based model with predefined process parameters x, the sum of the model prediction of first Gaussian process model $GP_0$ and of third Gaussian process model $GP_1$ is used and subsequently transformed with the inverse of formula 16, the parameters being ascertained similarly to step 230.

The described method of the present invention is not limited to laser material processing, but may be applied similarly to arbitrary manufacturing methods and to arbitrary (technical or physical) systems such as, for example, mechatronic systems, in which an operating variable is optimally set in such a way that a model output variable of the system that characterizes the operating mode of the system is optimized.

What is claimed is:

1. A method for setting operating parameters of a laser material processing machine, using Bayesian optimization of a data-based model, the method comprising the following steps:
   receiving via an input interface of a test stand, from sensors of the laser material processing machine, at least one experimentally ascertained measured variable of the laser material processing machine;
   training the data-based model, in the Bayesian optimization, to output a model output variable which characterizes an operating mode of the laser material processing machine, as a function of the operating parameters, the training of the data-based model taking place as a function of the at least one experimentally ascertained measured variable of the laser material processing machine, and the training also taking place as a function of at least one simulatively ascertained simulation variable, the measured variable and the simulation variable each characterizing the operating mode of the laser material processing machine, the measured variable and/or the simulation variable being transformed during the training using an affine transformation, wherein the measured variable and/or the simulation variable is multiplied during the affine transformation by a factor, and the factor is selected as a function of a simulative model uncertainty and as a function of an experimental model uncertainty;
   setting, via an output interface of the test stand, the operating parameters of the laser material processing machine using the trained data-based model;
   the laser material processing machine performing laser material processing based on the set operating parameters.

2. The method as recited in claim 1, wherein the factor is selected as a function of a quotient of the simulative model uncertainty and of the experimental model uncertainty.

3. The method as recited in claim 1, wherein the data-based model includes a simulatively trained first submodel which is a first Gaussian process model, and an experimentally trained second submodel which is a second Gaussian process model, the simulative model uncertainty being ascertained using the first submodel and the experimental model uncertainty being ascertained using the second submodel.

4. The method as recited in claim 3, wherein the data-based model includes an experimentally trained third submodel which is a third Gaussian process model, and which is trained to output a difference between the experimentally ascertained measured variable and an output variable of the first submodel.

5. The method as recited in claim 3, wherein the second submodel is not trained using the transformed measured variable, but is trained using the measured variable.

6. The method as recited in claim 5, wherein the third submodel is trained using the transformed measured variable.

7. The method as recited in claim 4, wherein when ascertaining the transformed measured variable, the measured variable is transformed using the affine transformation, the difference being multiplied by the factor.

8. The method as recited in claim 4, wherein to ascertain the model output variable of the data-based model, an output variable of the first submodel and an output variable of the third submodel are added up and are transformed with an inverse of the affine transformation.

9. The method as recited in claim 4, wherein to ascertain an uncertainty of the model output variable of the data-based model, the uncertainty is ascertained using the second submodel.

10. The method as recited in claim 1, wherein the measured variable and the variable simulated by the simulation variable are different physical variables and include different physical units.

11. The method as recited in claim 1, wherein the laser material processing by the laser material processing machine includes performing by the laser material processing machine, based on the set operating parameters, laser welding or laser drilling.

12. A test stand for a laser material processing machine, the test stand configured to set operating parameters of the laser material processing machine, using Bayesian optimization of a data-based model, the test stand comprising:
an input interface configured to receive from sensors of the laser material processing machine, at least one experimentally ascertained measured variable of the laser material processing machine;
a processor;
a computer-readable memory medium; and
an output interface,
wherein the test stand is configured to:
train the data-based model, in the Bayesian optimization, to output a model output variable which characterizes an operating mode of the laser material processing machine, as a function of the operating parameters, the training of the data-based model taking place as a function of the at least one experimentally ascertained measured variable of the laser material processing machine received via the input interface, and the training also taking place as a function of at least one simulatively ascertained simulation variable, the measured variable and the simulation variable each characterizing the operating mode of the laser material processing machine, the measured variable and/or the simulation variable being transformed during the training using an affine transformation, wherein the measured variable and/or the simulation variable is multiplied during the affine transformation by a factor, and the factor is selected as a function of a simulative model uncertainty and as a function of an experimental model uncertainty;
wherein the test stand is further configured to:
set, via the output interface, the operating parameters of the laser material processing machine using the trained data-based model;
wherein the laser material processing machine is configured to perform laser material processing, based on the set operating parameters.

13. A non-transitory machine-readable memory medium on which is stored a computer program for setting operating parameters of a laser material processing machine, using Bayesian optimization of a data-based model, the computer program, when executed by a computer, causing the computer to perform the following steps:
receiving via an input interface of a test stand, from sensors of the laser material processing machine, at least one experimentally ascertained measured variable of the laser material processing machine;
training the data-based model, in the Bayesian optimization, to output a model output variable which characterizes an operating mode of the laser material processing machine, as a function of the operating parameters, the training of the data- based model taking place as a function of the at least one experimentally ascertained measured variable of the laser material processing machine, and the training also taking place as a function of at least one simulatively ascertained simulation variable, the measured variable and the simulation variable each characterizing the operating mode of the laser material processing machine, the measured variable and/or the simulation variable being transformed during the training using an affine transformation, wherein the measured variable and/or the simulation variable is multiplied during the affine transformation by a factor, and the factor is selected as a function of a simulative model uncertainty and as a function of an experimental model uncertainty;
setting, via an output interface of the test stand, the operating parameters of the laser material processing machine using the trained data-based model;
the laser material processing machine performing laser material processing based on the set operating parameters.

14. The non-transitory machine-readable memory medium as recited in claim 13, wherein the laser material processing by the laser material processing machine includes performing by the laser material processing machine, based on the set operating parameters, laser welding or laser drilling.

* * * * *